United States Patent
Haas et al.

(10) Patent No.: US 11,662,194 B2
(45) Date of Patent: May 30, 2023

(54) MEASUREMENT POINT DETERMINATION FOR COORDINATE MEASURING MACHINE MEASUREMENT PATHS

(71) Applicant: Carl Zeiss Industrielle Messtechnik GmbH, Oberkochen (DE)

(72) Inventors: Günter Haas, Aalen (DE); Rolf Häring, Giengen (DE); Jürgen Keller, Aalen (DE); Christian-Alexander Wirnsberger, Königsbronn (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 128 days.

(21) Appl. No.: 17/236,801

(22) Filed: Apr. 21, 2021

(65) Prior Publication Data
US 2021/0325164 A1    Oct. 21, 2021

(30) Foreign Application Priority Data
Apr. 21, 2020   (EP) .................................... 20170624

(51) Int. Cl.
*G01B 5/012* (2006.01)
*G01B 7/012* (2006.01)

(52) U.S. Cl.
CPC ............. *G01B 5/012* (2013.01); *G01B 7/012* (2013.01)

(58) Field of Classification Search
None
See application file for complete search history.

(56) References Cited

U.S. PATENT DOCUMENTS

| | | | | |
|---|---|---|---|---|
| 5,471,406 A | * | 11/1995 | Breyer | G01B 21/045 700/86 |
| 10,365,630 B2 | * | 7/2019 | Noda | G05B 19/401 |
| 11,204,237 B2 | * | 12/2021 | Sakakibara | G05B 19/401 |
| 2014/0059872 A1 | * | 3/2014 | Nakagawa | G01B 21/045 33/502 |
| 2015/0377617 A1 | * | 12/2015 | Ould | G01B 21/04 33/503 |
| 2016/0102960 A1 | * | 4/2016 | Dolgikh | G01B 21/047 33/503 |
| 2016/0195382 A1 | * | 7/2016 | McMurtry | G01B 5/012 33/503 |

(Continued)

FOREIGN PATENT DOCUMENTS

| | | | |
|---|---|---|---|
| DE | 102016120557 A1 | 5/2018 | |
| WO | WO-2005090900 A1 | * 9/2005 | ............ G01B 21/04 |
| WO | WO-2018060693 A1 | 4/2018 | |

*Primary Examiner* — Christopher W Fulton
(74) *Attorney, Agent, or Firm* — Miller Johnson

(57) ABSTRACT

A method for determining measurement points of an adapted measurement path for measuring a measurement object includes determining measurement points of an ideal measurement path. The method includes determining target measurement points of at least one guide path, which differs from the ideal measurement path. The method includes capturing actual measurement points along the at least one guide path using a coordinate measuring device. The method includes determining deviations between the target measurement points and the actual measurement points of the at least one guide path. The method includes determining the measurement points of the adapted measurement path by changing the measurement points of the ideal measurement path based on the deviations.

17 Claims, 2 Drawing Sheets

(56) References Cited

U.S. PATENT DOCUMENTS

2016/0341533 A1    11/2016  Noda
2019/0316893 A1    10/2019  Singh et al.
2020/0355495 A1*   11/2020  Mueller ............... G01B 21/045

* cited by examiner

MEASUREMENT POINT DETERMINATION FOR COORDINATE MEASURING MACHINE MEASUREMENT PATHS

CROSS-REFERENCE TO RELATED APPLICATIONS

This application claims priority to EP 20 170 624.9 filed Apr. 21, 2020, the entire disclosure of which is incorporated by reference.

FIELD

The present disclosure relates to industrial metrology and more particularly to determining measurement points of a measurement path for measuring a measurement object using a coordinate measuring device.

BACKGROUND

Coordinate measuring machines are well known in the prior art. They are used to check workpieces, for example as part of a quality check, or to ascertain the geometry of a workpiece. Moreover, multifarious further application possibilities are conceivable.

For measuring a measurement object, a sensor of a coordinate measuring machine is moved along a measurement path, wherein measurement values are generated at points of the measurement path, which measurement values then represent the coordinate of a point or section of the measurement object. The measurement path is frequently determined on the basis of ideal geometry data of the measurement object. If the geometry of the real measurement object deviates from said ideal geometry, however, for example due to a deformation such as bending of the measurement object, the situation may arise that the measurement object or the section to be measured of the measurement object no longer lies within the capturing region of the sensor or moves out of the capturing region of the sensor when the latter is moved along the measurement path. For example, a tactile sensor may no longer be in contact with or lose contact with the measurement object. In the case of an optical sensor, the measurement object may not be arranged within the capturing region of the sensor or move out of it. This risk is high for example when measuring an edge of the measurement object. In such a case, the measurement object can no longer be reliably measured.

For this reason, there are approaches for determining an adapted or corrected measurement path.

DE 10 2016 120 557 A1 discloses a system for dimensionally measuring an object, having an optical 3D sensor with two-dimensional contact-probing for capturing first three-dimensional data of the object, and having a coordinate measuring machine with an optical and/or tactile sensor for three-dimensionally probing the object. The system comprises:
an optical 3-D sensor with two-dimensional contact-probing for capturing first three-dimensional data of the object;
a coordinate measuring machine with an optical and/or tactile sensor for three dimensionally probing the object;
a storage unit for storing a target measurement path that is determined on the basis of a target contour of the object and along which the optical and/or tactile sensor of the coordinate measuring machine is to be moved for probing the object; and
an evaluation and control unit, which is configured for determining a corrected measurement path on the basis of the first three-dimensional data captured using the optical 3D sensor with two-dimensional contact-probing and of the target measurement path stored in the storage unit, and for moving the optical and/or tactile sensor of the coordinate measuring machine along the corrected measurement path for capturing second three-dimensional data of the object. The system described in DE 10 2016 120 557 A1 requires an optical 3D sensor with two-dimensional contact-probing to determine the corrected measurement path. This increases production costs and a required installation space of the system.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The technical problem of providing a method and an apparatus for determining measurement points of an adapted measurement path for measuring a measurement object using a coordinate measuring device and a program that avoid the explained disadvantages, thus in particular of providing the determination of a corrected measurement path with a reduced number of required components and thus also with reduced production costs and reduced required installation space, arises.

The solution to the technical problem is provided by the subjects having the features of the independent claims. Further advantageous configurations of the invention are evident from the dependent claims.

A method for determining measurement points of an adapted measurement path is proposed. The measurement path serves for measuring a measurement object using a coordinate measuring device. A measurement point here denotes a point of the measurement object, in particular a surface point.

A measurement-point-specific sensor pose can be determined in dependence on the measurement point, wherein the measurement-point-specific sensor pose denotes a position and/or an orientation of a sensor of the coordinate measuring device, wherein a coordinate measurement of the measurement point is performed when the sensor is located at the position and/or has the orientation. A sensor path or sensor trajectory can thus be determined in dependence on the measurement path.

The position and orientation can refer here to a reference coordinate system, for example a coordinate system of the coordinate measuring device. The measurement object is measured using the coordinate measuring device by moving the sensor along measurement-point-specific sensor poses and then performing a coordinate measurement to capture the measurement points, that is to say to capture coordinate information. The coordinate measuring device, in particular moving parts of the coordinate measuring device, can here be actuated such that the sensor is moved along the corresponding sensor track.

The coordinate measuring machine may be, for example, a coordinate measuring machine of a column-type or gantry-type construction.

In coordinate measuring machines, different types of sensors may be used to capture the coordinates of the object to be measured. For example, the sensor of the coordinate measuring machine can be a sensor that measures in a tactile manner, such as is sold by the applicant under the product name "VAST XT" or "VAST XXT." Here, the surface of the object to be measured is probed with a stylus, the coordinates of which in the measurement space are known at all times. Such a stylus may also be moved along the surface of an object so that a multiplicity of coordinates of the measurement object may be captured at set time intervals in such a measurement process within the scope of what is known as a "scanning method." Optical sensors that allow contactless capturing of the coordinates of an object can also be used. One example of such an optical sensor is the optical sensor sold by the applicant under the product name "LineScan." The optical sensors are, like the tactile sensors, primarily point or line sensors, capturing a point or a line, respectively, during a standstill. Camera sensors, like the optical sensor "ViScan" sold by the applicant, capture an image during a standstill. For comprehensively determining the object geometry, these sensors are moved along the measurement path over the object surface with the aid of the coordinate measuring machine.

The method proposed comprises determining measurement points of an ideal measurement path, in particular as a first step of the method. These ideal measurement points are measurement points that the sensor of the coordinate measuring machine can reliably capture in a corresponding measurement-point-specific sensor pose when the measurement object has its ideal shape, that is to say the target shape. In particular, capturability of an ideal measurement point under the assumption of the ideal shape of the measurement object using the sensor in a measurement-point-specific sensor pose can be assumed, that is to say for example the measurement object being touched by a tactile sensor or a state in which the measurement object is located in the capturing region of an optical sensor. In such a capturable state, it is thus possible for the measurement point or coordinates of the measurement point to be reliably captured by the sensor.

Consequently, a capturable state denotes in the following text a state in which a sensor of the coordinate measuring device can reliably capture the measurement object, in particular measurement points of the measurement object, and thus generate a reliable measurement value, for example a tactile sensor touches the measurement object, in particular a desired section of the measurement object, or the measurement object, in particular a desired section of the measurement object, is located in a capturing region of an optical sensor. A non-capturable state denotes a state in which a sensor of the coordinate measuring device cannot capture or can no longer reliably capture the measurement object, in particular measurement points of the measurement object, and thus cannot generate a reliable measurement value, for example a tactile sensor does not touch the measurement object or the measurement object, in particular a desired section of the measurement object, is not located in a capturing region of an optical sensor.

The measurement points of the ideal measurement path can be determined in particular in dependence on previously known geometry data of the measurement object, in particular in dependence on CAD data. For example, a user or an automatic method can define a measurement path on the basis of the previously known geometry data.

This measurement path can here be determined in a coordinate system of the geometry data, wherein in that case a transformation to the coordinate system of the coordinate measuring device is necessary. In order to determine such a transformation, a calibration process that is known to a person skilled in the art can be performed, by way of which a relative location of the measurement object in the measurement space of the coordinate measuring device is determined. If this relative location is known, a transformation from the coordinate system of the geometry data to the coordinate system of the coordinate measuring device can be determined and, with this transformation, the measurement points of the measurement path in this coordinate system can then be determined.

It is also possible that measurement points of the ideal measurement path are determined by virtue of the measurement object being measured, in particular using the coordinate measuring device or a further coordinate measuring device that differs from the coordinate measuring device for measuring with the adapted measurement path, wherein, on account of the measurement, geometry data of the measurement object are determined and the measurement points are then determined in dependence on or based on the geometry data. For the measurement for determining the geometry data for the determination of the measurement points of the ideal measurement path, a tactile, preferably an optical, sensor, with particular preference an optical 3D sensor with two-dimensional contact-probing, can be used, wherein the optical 3D sensor can generate a three-dimensional point cloud representing the surface of the measurement object. Such a sensor can be a strip projection sensor described in DE 10 2016 120 557 A1, which was discussed in the introductory part. Here, the sensor that is used for the measurement for determining the geometry data for the determination of the measurement points of the ideal measurement path can differ from the sensor with which the measurement with the adapted measurement path that is to be determined as proposed is performed.

Furthermore, target measurement points of at least one guide path, which differs from the ideal measurement path, are determined in particular in a second step of the proposed method. The target measurement points of the guide path can be determined—as previously with respect to the measurement points of the ideal measurement path—in dependence on previously known geometry data of the measurement object or in dependence on geometry data of the measurement object that are determined by a measurement using the coordinate measuring device or a further coordinate measuring device.

In particular, the target measurement points of the guide path can be determined such that coordinate measurements are performed, using the sensor of the coordinate measuring device, in or along a section of the measurement object that differs from the section that is to be measured using the ideal measurement path. The section of the measurement object to be measured using target measurement points can be selected in particular such that a risk of a non-capturable state occurring is reduced compared to a measurement along the ideal measurement path.

The target measurement points of the guide path can be selected in particular such that a maximum value of the quantity of minimum distances between target measurement points of the guide path and the ideal measurement path is smaller than a predetermined value. This value can be selected depending on the use and lie, for example, in a range of 0.1 mm to 10.0 mm.

The number of the target measurement points of the guide path can be identical to the number of the measurement points of the ideal measurement path. However, a ratio between the number of the target measurement points of the guide path and the number of the measurement points of the ideal measurement path can also be selected depending on the use and lie in particular between 0.1 (inclusive) and 1.0 (inclusive) or be greater.

Furthermore, actual measurement points along the at least one guide path are captured by the coordinate measuring device or by a further coordinate measuring device, in particular in a third step of the proposed method. In particular, the sensor is moved for this purpose along the measurement-point-specific sensor poses determined in dependence on the measurement points of the guide path. Furthermore, in each case an actual measurement point, in particular coordinates of such an actual measurement point, is/are then captured in all or selected sensor poses of this sensor path.

Furthermore, the deviations between the target measurement points and the actual measurement points of the at least one guide path are determined, in particular in a fourth step of the proposed method. The deviation can be determined in particular in the form of a distance between the target measurement point and the actual measurement point captured in the target-measurement-point-specific sensor pose, furthermore in particular as a difference between the coordinate values of said measurement points.

Furthermore, the measurement points of the adapted measurement path, which can also be denoted as adapted measurement points, are determined by changing the measurement points of the ideal measurement path in dependence on the deviations, in particular in a fifth step of the proposed method. In particular, in each case an adapted measurement point can be determined for each or selected ideal measurement point(s) such that the distance from the corresponding ideal measurement point, in particular the difference between the coordinate values of the measurement points, corresponds to the distance between a target measurement point of the guide path assigned to the ideal measurement point and the actual measurement point captured in the target-measurement-point-specific sensor pose, in particular the difference between the coordinate values of said measurement points.

For this purpose, each measurement point of the ideal measurement path can be assigned a target measurement point of the guide path. For example, the target measurement point of the guide path having the smallest distance of all the measurement points of the guide path from the measurement point of the ideal measurement path can be the measurement point assigned thereto. To determine such a point of the guide path, it is also possible for an interpolation to be carried out as a function of the target measurement points of the guide path, for example a spline interpolation. This can be accomplished in particular if a number of the target measurement points of the guide path differs from the number of the points of the ideal measurement path.

Furthermore, for each or selected adapted measurement point(s), in each case an adapted sensor pose and thus also an adopted sensor path can also be determined. Said adapted sensor path can then be used to measure the measurement object. In particular, the coordinate measuring device can be controlled such that the sensor is moved along the adapted sensor path and captures measurement points along it.

This advantageously produces a method for determining measurement points of an adapted measurement path, which reliably reduces the risk of a non-capturable state of the measurement object, in particular of a desired section of the measurement object, occurring, wherein at the same time the number of the components required herefor and thus also production costs and a required installation space of an apparatus that is suitable for carrying out the method are reduced.

In a further embodiment, the measurement path extends along an edge of the measurement object. In this case, the ideal measurement path can run in particular along the edge of the measurement object. In the case of edges, there is a particularly high risk of a non-capturable state, in particular if the actual geometry of the measurement object deviates from the ideal geometry, for example due to bending or deformations. This advantageously provides a method for determining a measurement path for capturing the relative location of an edge of the measurement object, which reduces the increased risk of a non-capturable state of the edge occurring.

In a further embodiment, the at least one guide path extends parallel to the ideal measurement path. This advantageously provides a simple determination of the target measurement points of the guide path that are assigned to the measurement points of the ideal measurement path. In particular, the measurement point that is assigned to a selected measurement point of the ideal measurement path can be determined as an intersection of a connecting line between the guide path and the ideal measurement path, wherein the connecting line intersects the selected measurement point on the ideal measurement path and is oriented perpendicularly to the ideal measurement path. Furthermore, the reliability of avoiding non-capturable states advantageously increases, in particular when measuring an edge, because for a multiplicity of measurement objects it can be assumed that deviations between target position and actual position of measurement points in the case of parallel measurement paths that are not spaced apart by more than a predetermined extent do not significantly change.

In a further embodiment, the guide path extends along an area of the measurement object. An area can here be a region of the measurement object in which no regular change in orientation of the normal vector of the surface of the measurement object occurs. The area can in particular be a non-curved area. This is not mandatory, however. For example, it is also conceivable for the area to be a curved area. However, the area does not comprise any edge or corner. This advantageously increases the reliability of the capturing of actual measurement points, since the risk of non-capturable states in the case of measurement paths along areas is smaller than in the case of, for example, measurement paths along edges. Thus, the reliability of the determination of the measurement points of the adapted measurement path also advantageously increases.

In a further embodiment, the ideal measurement path extends along an edge of the measurement object, wherein the area is an area delimited by the edge. In other words, the area is an area adjacent to the edge or an area terminating with the edge. It can be assumed that in the case of deformations of the measurement object, the effects on the edge profile are similar or equal to the effects on the area profile. Thus, the reliability of avoiding non-capturable states during the measurement of an edge is increased, since it can be assumed that deviations between target position and actual position of measurement points along the guide path are equal to the deviation between target position and actual position of measurement points along the ideal measurement path.

In a further embodiment, a maximum value of the distances between a target measurement point of the guide path and the closest measurement point of the ideal measurement path is smaller than a predetermined distance. This has been explained above. Due to the spatial proximity between the guide path and the ideal measurement path, the likelihood that the effect of deformations of the measurement object on the profile of the ideal measurement path are similar or equal to the effects on the profile of the target guide path, along which said effects are then quantified by the determination of the deviations between target position and actual position of the measurement points, then advantageously increases. If this effect is then, as has been discussed previously, transferred to the profile of the ideal measurement path to determine the actual profile of the ideal measurement path, the result is advantageously a high reliability of avoiding non-capturable states during the measurement along the adapted measurement path.

In a further embodiment, an orientation of the sensor for capturing at least one actual measurement point of the guide path differs from an orientation of the sensor for capturing at least one measurement point of the ideal measurement path.

For this purpose, after the determination of the measurement points of the ideal measurement path, as has been discussed previously, the measurement-point-specific orientation of the sensor with which the corresponding measurement point is captured (or is to be captured) can also be determined. Furthermore, after the determination of the target measurement points of the guide path, as has been discussed previously, the measurement-point-specific orientation of the sensor with which the corresponding measurement point is captured (or is to be captured), wherein said orientation differs from the previously determined orientation of the sensor for capturing the measurement points of the ideal measurement path, can also be determined. It is furthermore possible that the orientation of the sensor for capturing at least one measurement point of the adapted measurement path differs from an orientation of the sensor for capturing at least one target measurement point of the guide path. After the determination of the measurement points of the adapted measurement path, it is possible for this purpose for each of said measurement points to determine a measurement-point-specific orientation of the sensor, which differs from the orientation of the sensor for capturing the respectively assigned target measurement points of the guide path. The orientation of the sensor for capturing at least one measurement point of the adapted measurement path can also be equal to the orientation of the sensor for capturing at least one measurement point of the ideal measurement path.

It is possible that, for all measurement points of the guide path, the same orientation of the sensor for capturing them is determined. It is also possible for a same orientation of the sensor for capturing all the measurement points of the ideal measurement path and a same orientation of the sensor for capturing all the measurement points of the adapted measurement path to be determined. However, it is also possible that different orientations of the sensor are determined for different measurement points of the guide path, and/or different orientations of the sensor are determined for different measurement points of the ideal measurement path, and/or different orientations of the sensor are determined for different measuring points of the adapted measuring path. In this case, the orientations of the sensor for capturing mutually assigned measurement points of the ideal measurement path and of the guide path can be determined as orientations that differ from each other, wherein a measurement point of the ideal measurement path is assigned, for example, the intersection of a connecting line with the guide path as an assigned measurement point of the guide path, wherein the connecting line intersects the ideal measurement path in the measurement point and is oriented perpendicularly to the measurement path. Similar applies to the assignment of measuring points of the ideal measurement path to measurement points of the adapted measurement path.

The setting of different orientations here advantageously allows particularly reliable capturing of measurement points along the guide path. In particular, the orientation of the sensor for capturing the measurement point of the guide path can be selected parallel to an orientation of a surface normal vector of the measurement object in the measurement point. This is advantageous in particular for determining measurement points along an edge, since in this case the orientation of the sensor for determining the actual measurement points along the guide path can be adapted to the orientation of a surface normal of an area that is delimited by the edge.

The setting of different orientations also allows that a sensor can be aligned such that an accuracy of the sensor during determination of deviations is maximized. For example, if the target measurement points of the guide path lie in one plane and, for example, deviations parallel to a normal of said plane are to be determined, the orientation of the tactile sensor having a stylus can be set for example such that a longitudinal axis of the stylus in a non-deflected state is likewise parallel to the normal, since such a tactile sensor can generally detect such deflections along the longitudinal axis very precisely. However, if the sensor is an optical sensor, the orientation of the optical sensor can be set for example such that the optical axis of the sensor is oriented at a right angle to the normal, since such an optical sensor generally has a high resolution and thus accuracy during the determination of deviations in directions perpendicular to the optical axis.

Due to this adaptation, an undesired effect of a probe bending on a measurement result can also be reduced.

In a further embodiment, the orientations differ by 90°. The advantageous result is a particularly good adaptation to a tactile sensor, which comprises different styli with probe spheres arranged thereon for contact-probing a surface of the measurement object, wherein the orientations of the longitudinal axes of the styli differ from one another by 90°.

In addition to the previously mentioned advantages, a further advantageous result is that an edge profile can be captured reliably, wherein the edge is formed by two areas that are oriented at a right angle or substantially at a right angle with respect one another. For example, the edge profile of an edge that is formed by an inner lateral surface or an outer lateral surface of a (hollow) cylindrical test element and a front face of said test element that is oriented perpendicularly thereto can thus be measured.

In a further embodiment, the measurement points of the ideal measurement path and the target measurement points of the guide path are determined based on models, in particular on CAD models. This has already been explained above. This advantageously results in a particularly simple and temporal determination of the measurement points of the ideal measurement path and thus also a temporally fast determination of the measuring points of the adapted measurement path.

In a further embodiment, for each measurement object that is to be measured at least the following steps are carried out again:

capturing actual measurement points along the at least one guide path using the coordinate measuring device or a further coordinate measuring device, determining the deviations between the target measurement points and the actual measurement points of the at least one guide path, determining the measurement points of the adapted measurement path by changing the measurement points of the ideal measurement path in dependence on the deviations.

It is of course additionally possible that the determination of measurement points of an ideal measurement path and the determination of target measurement points of at least one guide path that differs from the ideal measurement path are also performed again for each new measurement object. For this purpose, a previously determined adapted measurement path can be reset before the adapted measurement path for a new measurement object is determined, in particular to the ideal measurement path or to a further ideal measurement path. As a result, the risk of a non-capturable state of the measurement object, in particular of a desired section of the measurement object, occurring can be advantageously reliably reduced in a measurement-object-specific manner.

A program is furthermore proposed which, when executed on or by a computer or an evaluation device, causes the computer or the evaluation device to carry out one, a plurality or all of the steps of the method for determining measurement points of an adapted measurement path as illustrated in this disclosure. In particular, the program can carry out the corresponding determination steps and ascertainment steps. The program can also control a coordinate measuring device for capturing the actual measurement points of the guide path.

Alternatively or cumulatively, a program storage medium or computer program product, on or in which the program is stored, in particular in a non-temporary, e.g. permanent, form, is described. Alternatively or cumulatively, a computer that comprises this program storage medium is described. Further alternatively or cumulatively, a signal is described, for example a digital signal, which encodes information representing the program and which comprises coding means adapted to carry out one, a plurality or all of the steps of the method illustrated in this disclosure for determining measurement points of an adapted measurement path for measuring a measurement object using a coordinate measuring device. The signal can be a physical signal, e.g. an electrical signal, which in particular is generated technically or by machine. The program can also cause the computer to generate measurement points along the adapted measurement path.

Furthermore, the method for determining measurement points of an adapted measurement path may be a computer-implemented method. As such, for example, one, a plurality or all of the steps of the method can be carried out by a computer. One embodiment of the computer-implemented method is the use of the computer for carrying out a data processing method. The computer may for example comprise at least one computing device, in particular a processor, and for example at least one storage device, in order to process the data, in particular technically, for example electronically and/or optically. A computer can in this case be any kind of data processing device. A processor can be a semiconductor-based processor. Furthermore, the program can also cause the computer to carry out the capturing of actual measurement points along the at least one guide path using the coordinate measuring device or a further coordinate measuring device. In this case, the program can thus serve for controlling the coordinate measuring device or a further coordinate measuring device.

This advantageously provides a program for carrying out the proposed method with the corresponding technical advantages already discussed.

An apparatus for determining measurement points of an adapted measurement path for measuring a measurement object using a coordinate measuring device, wherein the apparatus comprises the coordinate measuring device or a further coordinate measuring device and at least one control and evaluation device, is furthermore proposed. The control and evaluation device may be in particular a computing device. This has already been explained above. Such a computing device can in particular be embodied as or comprise a microcontroller or an integrated circuit.

The apparatus is configured to carry out a method according to one of the embodiments described in this disclosure with the corresponding technical advantages. In particular, the apparatus is thus configured to carry out a method comprising the following steps:

determining measurement points of an ideal measurement path, determining target measurement points of at least one guide path, which differs from the ideal measurement path, capturing actual measurement points along the at least one guide path using the coordinate measuring device or a further coordinate measuring device, determining the deviations between the target measurement points and the actual measurement points of the at least one guide path, determining the measurement points of the adapted measurement path by changing the measurement points of the ideal measurement path in dependence on the deviations.

The apparatus can furthermore comprise an input device for prescribing, for example on the part of a user, the measurement points of the ideal measurement path. Said input device can also be used to prescribe an orientation of the sensor for capturing measurement points of the ideal measurement path and/or for capturing target measurement points of the guide path.

The input device can also serve for prescribing target measurement points of the guide path. The input device can furthermore serve for prescribing parameters necessary for the method, for example a maximum permissible distance between the measuring points of the ideal measurement path and the measurement points of the guide path.

The apparatus can furthermore comprise a display device for presenting the measurement object, the ideal measurement path, the measurement points of the ideal measurement path, the orientation of a sensor for capturing the measurement points of the ideal measurement path, the guide path, the target measurement points of the guide path and the orientation of the sensor for capturing the target measurement points.

A method for measuring a measurement object, wherein measurement points of an adapted measurement path are determined for measuring the measurement object using a coordinate measuring device according to one of the embodiments described in the present disclosure, wherein the coordinate measuring device is then controlled for capturing the adapted measurement points and corresponding measurement values are generated, for example by way of a sensor, is furthermore described.

A coordinate measuring device for measuring a measurement object, wherein the coordinate measuring device comprises an apparatus for determining measurement points of an adapted measurement path for measuring the measurement object using a coordinate measuring device according to one of the embodiments described in the present disclosure, wherein the coordinate measuring device is then controlled for capturing the adapted measurement points and corresponding measurement values are generated, for example by way of a sensor, is furthermore described. Controlling can be effected for example using a control device of the coordinate measuring device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

Identical reference signs hereinafter denote elements having identical or similar technical features. In the drawings, reference numbers may be reused to identify similar and/or identical elements.

DETAILED DESCRIPTION

Figure 1:
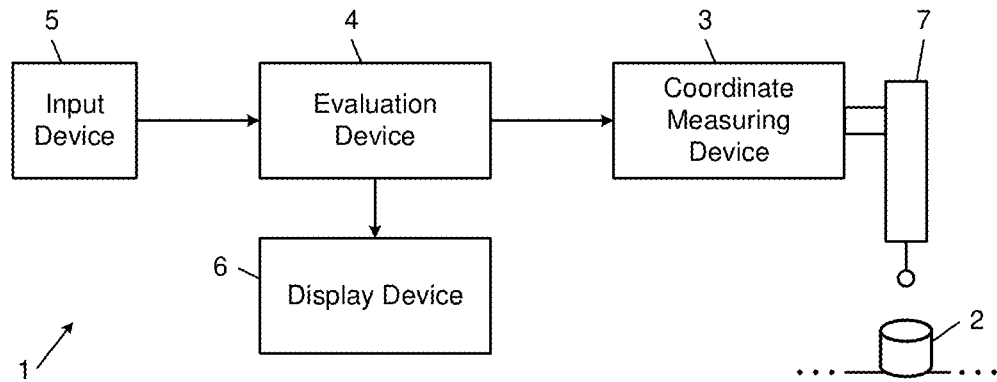
FIG. 1 is a schematic block diagram of an apparatus according to the principles of the present disclosure.

FIG. 1 shows a schematic block diagram of an apparatus 1 according to the invention for determining measurement points MPa (see FIG. 4b) of an adapted measurement path for measuring a measurement object 2 using a coordinate measuring device 3. This apparatus 1 comprises the coordinate measuring device 3 and a control and evaluation device 4. The apparatus 1 furthermore comprises an input device 5 for a user input and a display device 6 for presenting a virtual representation of the measurement object 2 and for presenting a virtual representation of measurement points MPi of the ideal measurement path, target measurement points MPs of a guide path and of orientations of a tactile sensor 7, which is set for capturing measurement points MPs, MPf, MPa along the different paths.

These orientations for capturing measurement points MPi, MPs, MPa of the ideal measurement path, of the guide path and of the adapted measurement path can be input by a user by means of the input device 5.

Figure 2:
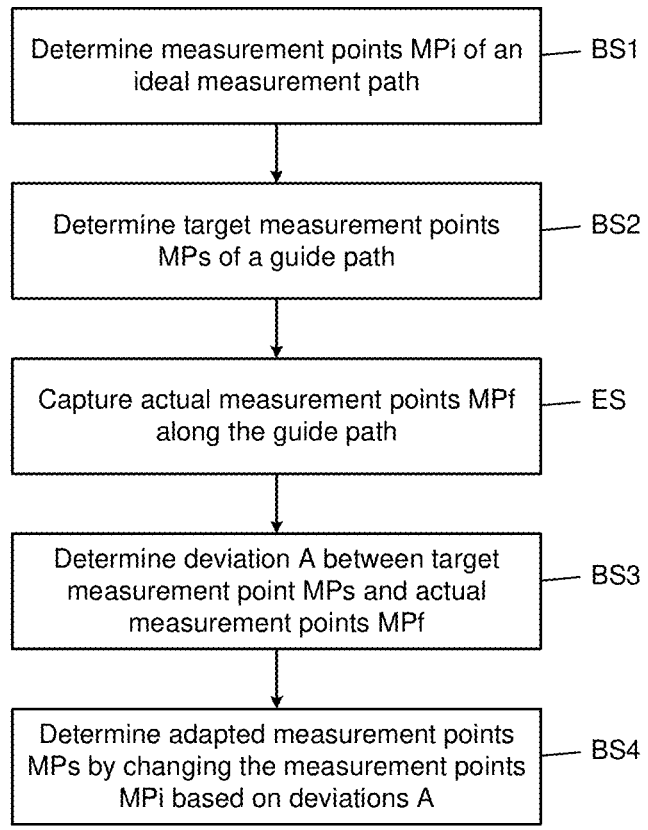
FIG. 2 is a schematic flow chart of a method according to the principles of the present disclosure.

The apparatus 1 illustrated is configured for carrying out the method illustrated in FIG. 2.

FIG. 2 shows a schematic flowchart of a method according to the invention for determining measurement points MPa of an adapted measurement path for measuring a measurement object 2 (see FIG. 1). The method comprises a first determination step BS1 for determining measurement points MPi of an ideal measurement path. They can be determined, for example, in a virtual environment, for example prescribed by a user or a (partially) automated method.

In a second determination step BS2, target measurement points MPs of a guide path, which differs from the ideal measurement path, are determined. These target measurement points MPs can also be prescribed by a user or a (partially) automated method. Furthermore, a position and/or orientation of a sensor, for example of the tactile sensor 7 illustrated in FIG. 1, of a coordinate measuring device 3 can be assigned to the measurement points. For this purpose, for example a desired orientation can be set, for example by a user or in a (partially) automated manner. The position of the sensor for capturing the prescribed measurement point MPi, MPs having the orientation prescribed by the user can then be determined in an automated manner.

In a capturing step ES, actual measurement points MPf are captured along the guide path prescribed in the second determination step BS2 using the coordinate measuring device 3 or a further coordinate measuring device (not illustrated). In a third determination step BS3, the deviation A between the target measurement point MPs and the actual measurement points MPf of the guide path is determined (see FIG. 4a).

In a fourth determination step BS4, adapted measurement points MPs are then determined by changing the measurement points MPi of the ideal measurement path in dependence on the deviations A. One example of such a change of the measurement points MPi of the ideal measurement path has already been explained.

Figure 3A:
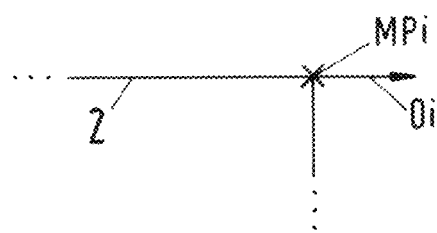
FIG. 3a is a schematic illustration of an ideal measurement object with an example measurement point of an ideal measurement path.

FIG. 3a shows a schematic illustration of an ideal measurement object 2, in particular an edge of said ideal measurement object 2. It furthermore shows an ideal measurement point MPi of an ideal measurement path and an orientation of a sensor for capturing said measurement point MPi, wherein the orientation is represented by an arrow Oi. It is evident that the measurement point MPi is a point along/at an edge of the measurement object 2. In particular, the ideal measurement path can thus run along said edge of the measurement object 2, wherein, in addition to the measurement point MPi that has been illustrated, further measurement points of said ideal measurement path are also arranged along the edge.

Figure 3B:
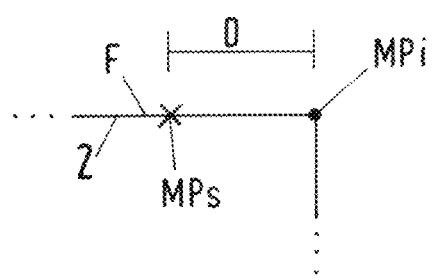
FIG. 3b is the ideal measurement object illustrated in FIG. 3a with a displaced measurement point.

FIG. 3b shows a schematic illustration of the ideal measurement object 2 with a measurement point MPs, which has been displaced by the distance D and forms a target measurement point MPs of a guide path, which differs from the ideal measurement path and extends parallel thereto. The illustrated example embodiment shows that the measurement paths are oriented parallel to a direction that is oriented perpendicularly to the plane of the drawing. It furthermore shows that the distance D between the measurement point MPi of the ideal measurement path and the target measurement point MPs of the guide path is measured along a straight line extending perpendicularly to the ideal measurement path and along an area F of the ideal measurement object 2, wherein the area F is an area that is delimited by the edge. The distance D can here be selected such that a maximum value of the distances D between a target measurement point MPs of the guide path and the respectively closest measurement point MPi of the ideal measurement path is smaller than a predetermined maximum permissible distance.

Figure 3C:
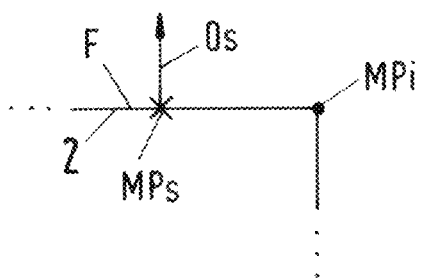
FIG. 3c is the ideal measurement object illustrated in FIG. 3a with a target measurement point of a guide path.

FIG. 3c shows a schematic illustration of the measurement object 2 illustrated in FIG. 3b, wherein additionally an orientation Os of the sensor for capturing the measurement point MPs of the guide path is illustrated. It is evident that the orientation of the sensor for capturing the measurement point MPi of the ideal measurement path differs from the orientation of the sensor for capturing the measurement point MPs of the guide path, wherein the angle difference between the orientations is 90°. The orientation of the sensor for capturing a measurement point MPs of the guide path can be set in particular such that it is parallel to a normal vector of the surface of the ideal measurement object in the measurement point MPs. If the measurement point MPs lies on a non-curved area, which is delimited by the edge, the orientation of the sensor for capturing the measurement point MPs can be set in particular such that it is parallel to a normal vector of said non-curved area.

Figure 4A:
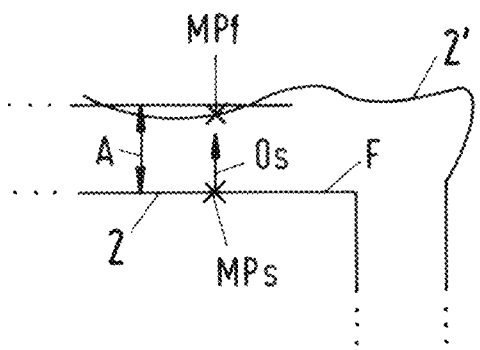
FIG. 4a is a schematic illustration of a real measurement point with an actual measurement point along the guide path.

FIG. 4a shows a schematic illustration of a real measurement object 2' together with the ideal measurement object 2 illustrated in FIG. 3c. The target measurement point MPs of the guide path and the corresponding orientation Os of the sensor for capturing said measurement point are illustrated here. Furthermore, the actual measurement point MPf is shown, which is captured when the sensor is controlled for capturing the target measurement point MPs by the coordinate measuring device 3. It is evident that a distance A between the actual measurement point MPf and the target measurement point MPs exists. Said distance is the result of the deviation of the shape of the real measurement object 2' from the shape of the ideal measuring object 2. FIG. 4a illustrates that this distance A is captured, owing to the set orientation of the sensor, along a distance capturing direction oriented perpendicularly to the area F.

Figure 4B:
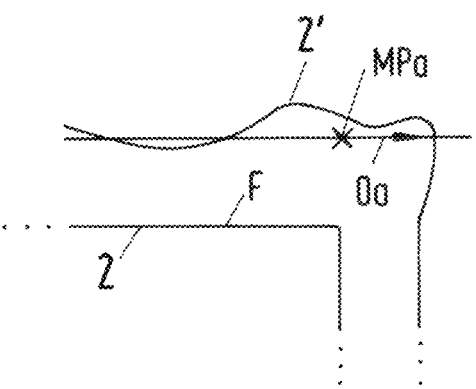
FIG. 4b is a schematic illustration of the real measurement object with an adapted measurement point.

FIG. 4b shows a further schematic illustration of the ideal measurement object 2 and of the real measurement object 2'. What is shown is that the measurement point MPi of the ideal measurement path illustrated in FIG. 3a was displaced by the distance A along the distance capturing direction, as a result of which a position of an adapted measurement point MPa is prescribed, in particular in a coordinate system of the measurement object 2. What is furthermore illustrated is that the orientation Oa of the sensor for capturing said adapted measurement point MPa is set equal to the orientation Oi for capturing the measurement point MPi of the ideal measurement path. If the edge along which the measurement point MPi of the ideal measurement path is arranged is formed as an intersecting or contact line of two areas and if the guide path is located in one of said areas, it is possible for example for the orientation of the sensor for capturing the measurement points of the adapted measurement path to be set parallel to a normal vector of the remaining area in the adapted measurement point.

If a sensor of a coordinate measuring device, for example of the coordinate measuring device 3 illustrated in FIG. 1, is positioned such that the adapted measurement point MPa of the adapted measurement path is captured by the sensor, then the explained adaptation advantageously results in the reliability of the generation of a measurement value that represents a spatial position of a surface point of the real measurement object 2' being increased by the sensor. The likelihood that the correspondingly generated measurement value actually represents a position of a desired spatial point of the measurement object 2, in this example embodiment an edge point, can also be increased.

In particular, the likelihood that the correspondingly positioned sensor is not in contact with the real measurement object 2' can be reduced. If the correspondingly positioned sensor has no contact with the real measurement object 2', the adaptation advantageously results in the distance between the correspondingly positioned sensor and a surface point of the real measurement object 2' being smaller than without adaptation. This, in turn, simplifies and accelerates a corresponding, for example automated, contact ascertainment by a sensor if the latter is correspondingly positioned. The setting of different orientations can also contribute to the reduction in the likelihood that the correspondingly positioned sensor has no contact with the real measurement object 2', or reduce the discussed distance in such a scenario, wherein it is also possible to increase the likelihood that the correspondingly generated measurement value actually represents a position of a desired spatial point of the measurement object 2, in this example embodiment an edge point.

In the example embodiment illustrated in FIG. 4b, a sensor will approach the real measurement object 2' from the right and make contact with it in the region of the edge and generate a measurement value. It is evident that the measurement value thus generated represents a more accurate position of the edge than a measurement value that is generated if the sensor is controlled for capturing the measurement point MPi of the ideal measurement path.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The phrase at least one of A, B, and C should be construed to mean a logical (A OR B OR C), using a non-exclusive logical OR, and should not be construed to mean "at least one of A, at least one of B, and at least one of C."

LIST OF REFERENCE SIGNS

1 Apparatus
2 Measurement object, ideal measurement object
2' Real measurement object
3 Coordinate measuring device
4 Control and evaluation device
5 Input device
6 Display device
7 Sensor
F Area
BS1 First determination step
BS2 Second determination step
ES Capturing step
BS3 Third determination step
BS4 Fourth determination step
MPi Measurement points of the ideal measurement path
MPs Target measurement points of the guide path
MPf Actual measurement point of the guide path
MPa Measurement point of the adapted measurement path
Oi Orientation of the sensor for capturing the measurement point of the ideal measurement path
Os Orientation of the sensor for capturing the target measurement points of the guide path
Oa Orientation of the sensor for capturing measurement points of the adapted measurement path
D Distance
A Distance

What is claimed is:

1. A method for determining measurement points of an adapted measurement path for measuring a measurement object, the method comprising:
   determining measurement points of an ideal measurement path;
   determining target measurement points of at least one guide path, which differs from the ideal measurement path;
   capturing actual measurement points along the at least one guide path using a coordinate measuring device;
   determining deviations between the target measurement points and the actual measurement points of the at least one guide path; and
   determining the measurement points of the adapted measurement path by changing the measurement points of the ideal measurement path based on the deviations.

2. The method of claim 1 wherein the measurement path extends along an edge of the measurement object.

3. The method of claim 2 wherein the guide path extends along an area of the measurement object.

4. The method of claim 3 wherein the area is delimited by the edge.

5. The method of claim 1 wherein the guide path extends parallel to the ideal measurement path.

6. The method of claim 5 wherein the measurement path extends along an edge of the measurement object.

7. The method of claim 6 wherein the guide path extends along an area of the measurement object.

8. The method of claim 7 wherein the area is delimited by the edge.

9. The method of claim 5 wherein the guide path extends along an area of the measurement object.

10. The method of claim 1 wherein the guide path extends along an area of the measurement object.

11. The method of claim 1 wherein a maximum value of distances between a target measurement point of the guide path and the respectively closest measurement point of the ideal measurement path is smaller than a predetermined distance.

12. The method of claim 1 wherein an orientation of a sensor for capturing the actual measurement points of the guide path differs from an orientation of a sensor for capturing the measurement points of the ideal measurement path.

13. The method of claim 12 wherein the orientations differ by 90°.

14. The method of claim 1 wherein the measurement points of the ideal measurement path and the target measurement points of the guide path are determined based on models.

15. The method of claim 1 wherein the adapted measurement path is reset to the ideal measurement path or to a further ideal measurement path before the adapted measurement path for a new measurement object is determined.

16. A non-transitory computer-readable medium storing instructions, the instructions comprising:
   determining measurement points of an ideal measurement path;
   determining target measurement points of at least one guide path, which differs from the ideal measurement path;
   capturing actual measurement points along the at least one guide path using a coordinate measuring device;
   determining deviations between the target measurement points and the actual measurement points of the at least one guide path; and
   determining measurement points of an adapted measurement path by changing the measurement points of the ideal measurement path based on the deviations.

17. An apparatus for determining measurement points of an adapted measurement path for measuring a measurement object, the apparatus comprising:
   a coordinate measuring device; and
   a control and evaluation device,
   wherein the apparatus is configured to perform operations including:
   determining measurement points of an ideal measurement path,
   determining target measurement points of at least one guide path, which differs from the ideal measurement path,
   capturing actual measurement points along the at least one guide path using the coordinate measuring device,
   determining deviations between the target measurement points and the actual measurement points of the at least one guide path, and
   determining the measurement points of the adapted measurement path by changing the measurement points of the ideal measurement path based on the deviations.

* * * * *